(12) United States Patent
Yang et al.

(10) Patent No.: US 10,147,093 B2
(45) Date of Patent: Dec. 4, 2018

(54) SYSTEM AND METHOD FOR CASH FLOW VERIFICATION BY THIRD PARTY PLATFORM

(71) Applicant: INTERNATIONAL GAMES SYSTEM CO., LTD., New Taipei (TW)

(72) Inventors: Jia-Wei Yang, New Taipei (TW); Shih-Ming Chang, New Taipei (TW)

(73) Assignee: INTERNATIONAL GAMES SYSTEM CO., LTD., New Taipei (TW)

(*) Notice: Subject to any disclaimer, the term of this patent is extended or adjusted under 35 U.S.C. 154(b) by 508 days.

(21) Appl. No.: 15/083,294

(22) Filed: Mar. 29, 2016

(65) Prior Publication Data
US 2017/0161740 A1    Jun. 8, 2017

(30) Foreign Application Priority Data

Dec. 4, 2015    (TW) .............................. 104140783 A

(51) Int. Cl.
*G06Q 20/40* (2012.01)
*G06Q 40/00* (2012.01)
*G06Q 20/02* (2012.01)

(52) U.S. Cl.
CPC .......... *G06Q 20/401* (2013.01); *G06Q 20/02* (2013.01); *G06Q 40/12* (2013.12); *G05B 2219/31215* (2013.01)

(58) Field of Classification Search
CPC ................. G05B 2219/31215; G06Q 20/401
See application file for complete search history.

(56) References Cited

U.S. PATENT DOCUMENTS

| 8,583,496 | B2 | 11/2013 | Yoo et al. |
| 8,720,771 | B2 | 5/2014 | MacKinnon Keith |
| 8,930,274 | B1 | 1/2015 | Brickell et al. |

FOREIGN PATENT DOCUMENTS

| CN | 104537529 A | 4/2015 |
| TW | I278213 | 4/2007 |
| TW | 200842753 | 11/2008 |
| TW | 201525898 | 7/2015 |

*Primary Examiner* — A Hunter Wilder
(74) *Attorney, Agent, or Firm* — CKC & Partners Co., Ltd.

(57) ABSTRACT

The present disclosure provides a system and a method for cash flow verification by a third-party payment platform. The system includes a server and a client device. The client device includes a network device, a storage device and a processor. The storage device is configured to store a plurality of programmed instructions and establish a client database. The processor is configured to execute the programmed instructions to generate execution history data, wherein the execution history data comprises cash flow history data, which can be produced by a third-party platform. While the network device is incapable of connecting the server through the Internet, the processor stores the execution history data in the client database; while the network device is capable of connecting the server through the Internet, the processor transmits the execution history data to the server through the network device for verification, and the verification comprises cash flow verification.

4 Claims, 4 Drawing Sheets

SYSTEM AND METHOD FOR CASH FLOW VERIFICATION BY THIRD PARTY PLATFORM

RELATED APPLICATIONS

This application claims priority to Taiwanese Application Serial Number 104140783, filed Dec. 4, 2015, which is herein incorporated by reference.

BACKGROUND

Field of Invention

The present invention relates to verification systems. More particularly, the present invention relates to systems and methods for cash flow verification by third-party payment platforms.

Description of Related Art

Due to the evolution of technology, the way that consumers access to services is changed. Specifically, nowadays consumers can use a computer or smart phone to connect the website through the Internet, so as to obtain a variety of services. But, with the popularity of web services, network security issues become more important, especially involving business services of cash flow, which for more stringent security requirements than other types of Web services. In order to strengthen the safety of web services for consumers, the current network uses multiple authentication mechanisms, so as to ensure the security of Web services. However, once the authentication mechanisms are not working properly, they will affect the Web services adversely.

In view of the foregoing, there is an urgent need in the elated field to provide a verification system, without affecting the Web services adversely.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

According to embodiments of the present disclosure, the present disclosure provides a system and a method for cash flow verification by a third-party payment platform to solve or circumvent aforesaid problems and disadvantages.

In one embodiment, the system includes a server and a client device. The client device includes a network device, a storage device and a processor. The storage device is configured to store a plurality of programmed instructions and establish a client database. The processor is configured to execute the programmed instructions to generate execution history data, wherein the execution history data comprises cash flow history data, which can be produced by a third-party platform. While the network device is incapable of connecting the server through the Internet, the processor stores the execution history data in the client database; while the network device is capable of connecting the server through the Internet, the processor transmits the execution history data to the server through the network device for verification, and the verification comprises cash flow verification.

In another embodiment, the method includes steps of using a client device to execute a plurality of programmed instructions, so as to generate execution history data, wherein the client device has a client database; and while the client device is incapable of connecting the server through the Internet, storing the execution history data in the client database; while the client device is capable of connecting the server through the Internet, transmitting the execution history data to the server for verification.

In view of the foregoing, according to embodiments of the present disclosure, the network device, the storage device and the processor are integrated in the client device, in which the client database is built in the storage device additionally. In this way, while the client device is incapable of connecting the server through the Internet, the client device can execute a plurality of programmed instructions to generate execution history data and stores the execution history data in the client database temporarily. While the client device is capable of connecting the server through the Internet, the client device transmits the execution history data to the server for verification.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
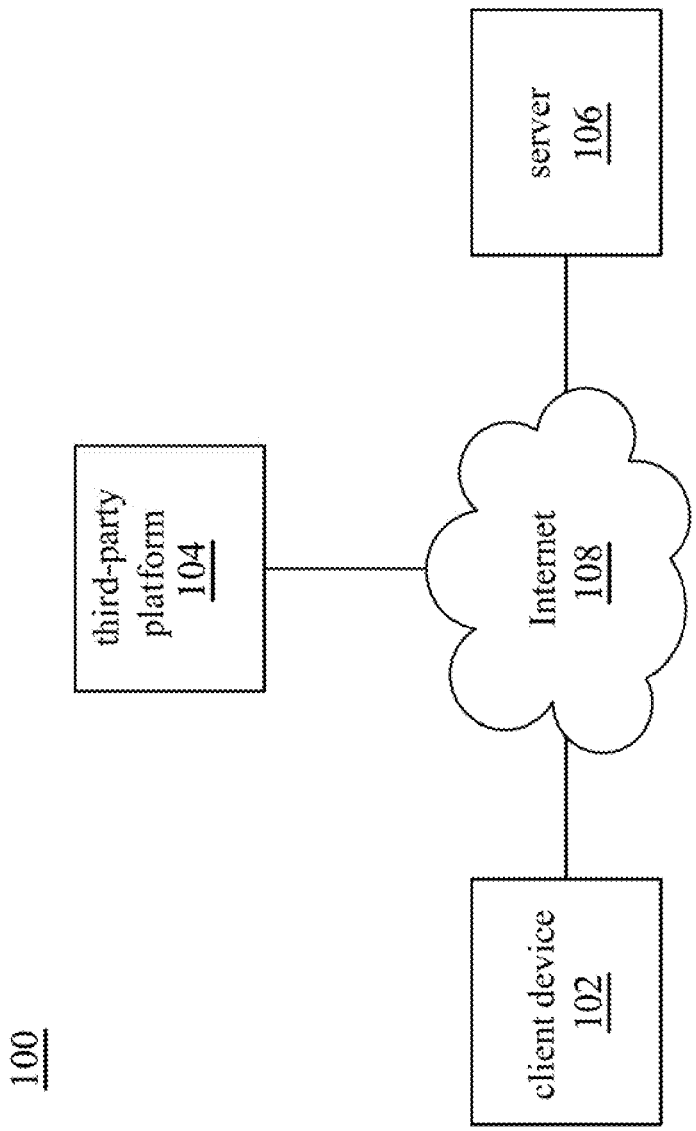
FIG. 1 is a block diagram of a system for cash flow verification by a third-party payment platform according to one embodiment of the present disclosure.

In the following detailed description, for purposes of explanation, numerous specific details are set forth in order to attain a thorough understanding of the disclosed embodiments. In accordance with common practice, like reference numerals and designations in the various drawings are used to indicate like elements/parts. Moreover, well-known elements or method steps are schematically shown or omitted in order to simplify the drawing and to avoid unnecessary limitation to the claimed invention.

As used in the description herein and throughout the claims that follow, the meaning of "a" "an", "an" and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a system 100 for cash flow verification by a third-party payment platform according to one embodiment of the present disclosure. As illustrated in FIG. 1, the system 100 includes a client device 102 and a server 106. The client device 102 is communicated with the server 106 through the Internet 108, where a client database is built in the client device 102. For example, the client device 102 may be a desktop, a laptop, a tablet, a smart phone or the like.

The client device 102 is configured to execute a plurality of programmed instructions and generate execution history data based on statuses of execution of the programmed instructions. Then, the client device 102 transmits the execution history data to the server 106 through the Internet 108. The server 106 receives the execution history data from the client device 102 and uses the execution history data for verification, so as to ensure the correctness of the execution history data. Based on connection statuses among the client device 102, Internet 108 and the server 106, the client device 102 can selectively store the execution history data in aforementioned built-in client database temporarily or transmits the execution history data to the server 106. Specifically, while the client device 102 is incapable of connecting the server 106 through the internet 108, the client device 102 stores the execution history data in the client database temporarily. While the client device 102 is capable of connecting the server 106 through the Internet 108, the client device 102 transmits the execution history data to the server 106 for verification.

In one embodiment, after the client device 102 stores the execution history data in the client database temporarily, the client device 102 accesses the execution history data in the client database periodically and then ensure a connection status between the client device 102 and the server 106 anew. The client device 102 repeats above operations in an iterative manner until the execution history data are transmitted to the server 106 for the verification. It should be noted that whether the connection between the client device 102 and the server 106 is established and the follow-up operations are disclosed in above embodiments and, thus, are not repeated herein.

In one embodiment, the client device 102 stores mall data, such as identification (ID) of logging in the server 106, token and so forth, in a user default file. The client device 102 executes the programmed instructions to generate the execution history data, and stores the execution history data in the client database (e.g., SQLLite).

In one embodiment, while the client device 102 is incapable of connecting the server 106 through the Internet 108, the client device 102 encrypts and stores the execution history data in the client database. Then, while the client device 102 is capable of connecting the server 106 through the Internet 108, the client device 102 transmits the execution history data that are encrypted to the server 106. After the server 106 receives the execution history data through the Internet 108 and completes the verification, the server 106 transmits a verification result to the client device 102.

For example, the client device 102 encrypts the execution history data according to advanced encryption standard (AES). Specifically, the client device 102 performs operations based on AES, as follows. First, in a matrix of bytes, the execution history data with the preset key are used in logical exclusive or operation. Next, the matrix of bytes is converted through a nonlinear function. Furthermore, a shift operation is performed on each column of the matrix of bytes. Finally, a multiplication operation is performed on each row of the matrix of bytes and its polynomial. Through selections and permutations of the above operations, the client device 102 to complete the encryption of the execution history data.

Furthermore, by reversing the selections and permutations of the above operations according to AES, the server 106 can decrypt the encrypted execution history data. For example, the client device 102 uses a first operation and then a second operation to encrypt the execution history data, and therefore the server 106 reversely uses the second operation and then the first operation to decrypt the encrypted execution history data. Depending on whether a preset key of the client device 102 and a preset key of server 106 preset key are the same, encryption and decryption methods can includes symmetric encryption and decryption methods, and asymmetric encryption and decryption methods. The encryption and decryption method based on AES belongs to the symmetric encryption and decryption method. It should be appreciated that the above embodiments are merely exemplary encryption and decryption methods, and not intended to limit the present disclosure.

In above embodiment, after the client device 102 receives the verification result, when the client device 102 selectively deletes the execution history data in the client data base. Specifically, when the client device 102 determines that the verification result comprises information on process completion, the client device 102 deletes the execution history data that temporarily stored in the client database.

Figure 2:
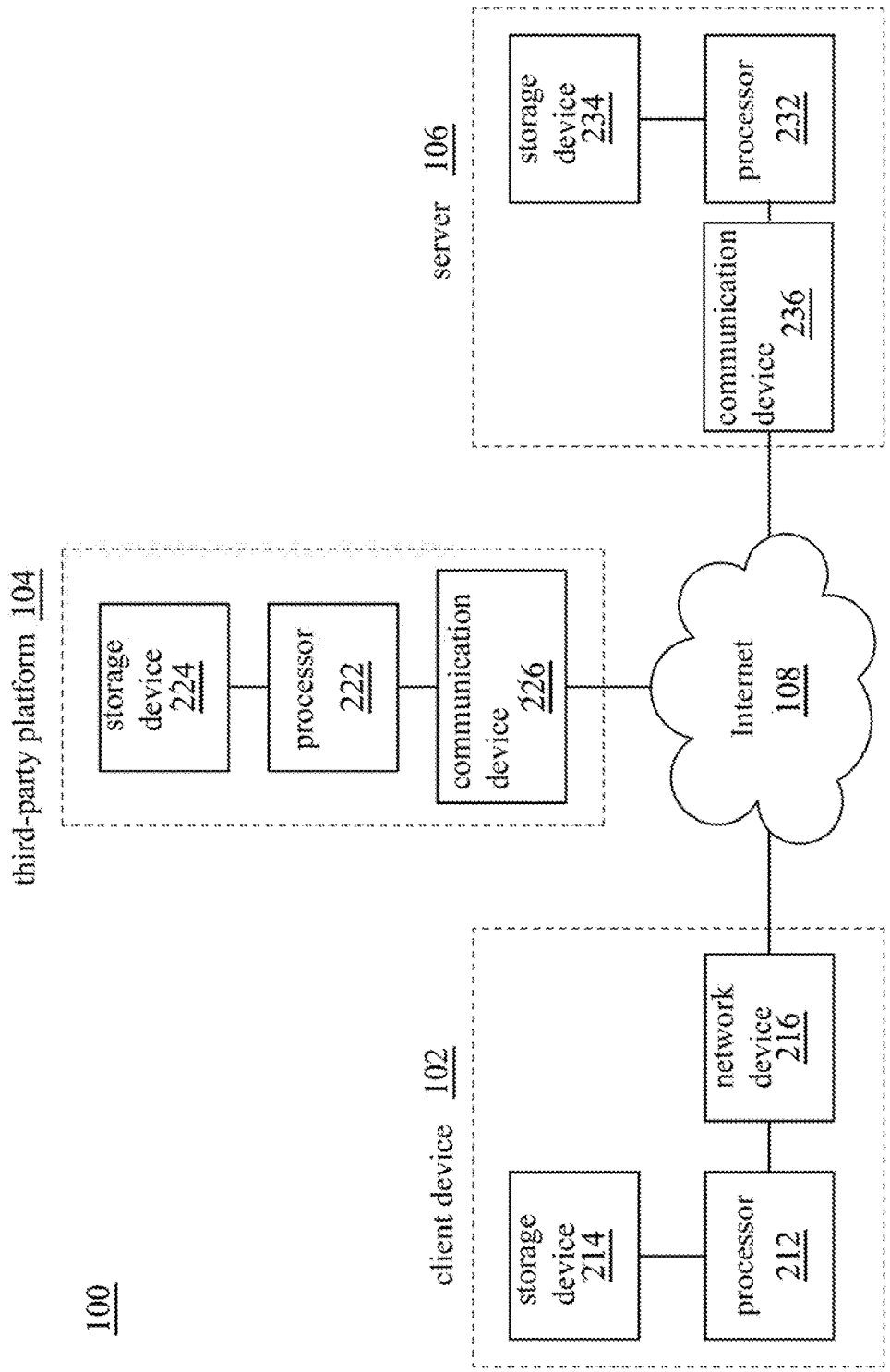
FIG. 2 is a block diagram of a system for cash flow verification by a third-party payment platform according to another embodiment of the present disclosure.

In one embodiment, the server 106 uses the previous execution history data stored in its the storage device (e.g., the storage device 234 as shown in FIG. 2) as a basis of verification and then verifies the current execution history data generated by the client device 102, where the previous execution history data are previously generated and transmitted to the server 106. Specifically, the server 106 uses default numerical functions to compute a preset difference range and then analyze whether a difference between the previous execution history data and the current execution history data exceeds the preset difference range, so as to produce a verification result, where the default numerical functions are elated to the previous execution history data and the current execution history data. For example, the server 106 is a game server, and the execution history data generated by the client device 102 are the game execution history data; the server 106 computes the preset difference range (e.g., a reasonable increase range about game tokens or play times) based on a time interval between any two of the game execution history data.

In above embodiment, based on the verification result, the server 106 selectively replaces the previous execution history data with the current execution history data. Specifically, when the difference between the previous execution history data and the current execution history data is less than the preset difference range, the server 106 deletes the previous execution history data and stores the current execution history data that pass through the verification in its storage device, and then transmits the verification result to the client device 102. When the difference between the previous execution history data and the current execution history data exceeds, the preset difference range, the server 106 deletes the current execution history data, and then transmits the verification result to the client device 102. For example, the server 106 is a game server, and the execution history data generated by the client device 102 are the game execution history data. When the server 106 determines that the difference between the previous game execution history data and the current game execution history data is less than the preset difference range (e.g., a reasonable increase range about game tokens or play times), the server 106 selectively replaces the previous game execution history data with the current game execution history data. When the server 106 determines that the difference between the previous game execution history data and the current game execution history data exceeds the preset difference range, the server 106 resets new game execution history data for the client device 102. For example, the server 106 uses the previous game execution history data as the new game execution history data for the client device 102 or make the client device 102 operates in an initial state of the game.

In one embodiment, the system 100 further includes a third-party platform 104, and the third-party platform 104 is communicated with the client device 102 and the server 106 through the Internet 108. The programmed instructions executed by the client device 102 include a software program and a software development kit (SDK) related to the software program. After the client device 102 is connected to the third-party platform 104, when the client device 102 executes the SDK, the client device 102 performs a cash flow process related to the software program through a connection between the client device 102 and the third-party platform 104, so as to generate the cash flow history data. Then, the client device 102 adds the cash flow history data to the execution history data. It should be noted that the verification of the execution history data is disclosed in above embodiments and, thus, are not repeated herein.

In above embodiment, the software program may be a game program. The client device 102 executes the game program to generate the game execution history data and then adds the game execution history data to the execution history data. In one embodiment, the client device 102 adds the game execution history data to the execution history data without through the third-party platform 104 and then transmits the execution history data to the server 106. Although the execution history data includes the game execution history data, it should be noted that the verification of the execution history data is disclosed in above embodiments and, thus, are not repeated herein.

In one embodiment, the third-party platform 104 is concurrently connected to the client device 102 and the server 106 through the Internet 108, so as to transmit the cash flow history data generated by the client device 102 to the server 106 for the verification. Specifically, while the client device 102 is incapable of connecting the third-party platform 104 through Internet 108, the client device 102 stores the cash flow history data in its built-in client database temporarily. While the client device 102 is capable of connecting the third-party platform 104 through the Internet 108 the client device 102 transmits the cash flow history data to the third-party platform 104, so that the third-party platform 104 can performs the verification related to the cash flow history data. The client device 102 receives a result of the cash flow verification from the third-party platform 104. It should be noted that the verification of the cash flow history data is disclosed in above embodiments and, thus, are not repeated herein.

FIG. 2 is a block diagram of a system 100 for cash flour verification by a third-party payment platform according to another embodiment of the present disclosure. As illustrated in FIG. 2, the client device 102 includes a processor 212, a storage device 214 and a network device 216, and the server 106 includes a processor 232, a storage device 234 and a communication device 236, where the client device 102 is connected to the server 106 through the Internet 108. In the client device 102, the network device 216 and the storage device 214 are electrically connected to the processor 212. In the server 106, the communication device 236 and the storage device 234 are electrically connected to the processor 232. For example, the client device 102 may be a desktop, a laptop, a tablet, a smart phone or the like, the storage device 214 and 234 may be hard disk drives (HDD) or memory devices, and the processor 212 and 232 may be central processing units (CPU).

In the client device 102, the storage device 214 stores a plurality of programmed instructions, the processor 212 is configured to execute the programmed instructions and generate execution history data based on statuses of execution of the programmed instructions, and the storage device 214 has the client database. The network device 216 is configured to transmit the execution history data to the server 106 through the Internet 108. Based on connection statuses among the client device 102, the Internet 108 and the server 106, the client device 102 can selectively stores the execution history data in aforementioned built-in client database temporarily or transmits the execution history data to the server 106. Specifically, the network device 216 of the network device 102 is incapable of connecting the server 106 through the Internet 108, the processor 212 stores the execution history data in the client database temporarily. While the network device 216 is capable of connecting the server 106 through the Internet 108, the network device 216 transmits the execution history data the server 106 for verification. In the server 106, the processor 232 is configured to verify the execution history data generated by the processor 212 of the client device 102, the storage device 234 stores the execution history data from the client device 102, and the communication device 236 is configured to receive the execution history data that are transmitted by the network device 216 of the client device 102 through the Internet 108. It should be noted that FIG. 2 illustrates hardware for illustrative purposes only, and not intended to limit the present disclosure.

In one embodiment, after the processor 212 of the client device 102 stores the execution history data in the client database of the storage device 214 temporarily, the processor 212 accesses the execution history data in the client database periodically and then ensure a connection status between the network device 216 of the client device 102 and the communication device 236 of the server 106 anew. The client device 102 repeats above operations in an iterative manner until the execution history data are transmitted to the server 106 for the verification. It should be noted that whether the connection between the client device 102 and the server 106 is established and the follow-up operations are disclosed in above embodiments and, thus, are not repeated herein.

In one embodiment, the processor 212 of the client device 102 stores small data, such as identification (ID) of logging in the server 106, token and so forth, in a user default file. The processor 212 of the client device 102 executes the programmed instructions to generate the execution history data, and stores the execution history data in the client database (e.g., SQLLite) built in the storage device 214.

In one embodiment while the network device 216 of the client device 102 is incapable of connecting the server 106 through the Internet 108, the processor 212 encrypts and stores the execution history data in the client database built in the storage device 214. Then, while the client device 102 is capable of connecting the server 106 through the Internet 108, the network device 216 transmits the execution history data that are encrypted to the server 106. After the server 106 receives the execution history data through the Internet 108 and completes the verification, the server 106 transmits a verification result to the client device 102. For example, the client device 102 encrypts the execution history data according to advanced encryption standard (AES), and the server 106 decrypts the encrypted execution history data for the verification. It should be noted that the AES is disclosed in above embodiments and, thus, are not repeated herein.

In above embodiment, after the network device 216 of the client device 102 receives the verification result, when the processor 212 selectively deletes the execution history data in the client database. Specifically, when the processor 212 determines that the verification result comprises information on process completion, the processor 212 deletes the execution history data that temporarily stored in the client database.

In one embodiment, the storage device 234 of the server 106 stores the previous execution history data. In the server 106, the processor 232 uses the previous execution history data as a basis of verification and then verifies the current execution history data generated by the processor 212 of the client device 102, where the previous execution history data are previously generated and transmitted to the server 106. Specifically, the processor 232 of the server 106 uses default numerical functions to compute a preset difference range and then analyze whether a difference between the previous execution history data and the current execution history data exceeds the preset difference range, so as to produce a verification result, where the default numerical functions are related to the previous execution history data and the current execution history data. For example, the server 106 is a game server, and the execution history data generated by the client device 102 are the game execution history data; in the server 106, the processor 232 computes the preset difference range (e.g., a reasonable increase range about game tokens or play times) based on a time interval between any two of the game execution history data.

In above embodiment, based on the verification result, the processor 232 of the server 106 selectively replaces the previous execution history data with the current execution history data. Specifically, when the difference between the previous execution history data and the current execution history data is less than the preset difference range, the processor 232 deletes the previous execution history data and stores the current execution history data that pass through the verification in the storage device 234, and then the communication device 236 transmits the verification result to the client device 102. When the difference between the previous execution history data and the current execution history data exceeds the preset difference range, the processor 232 deletes the current execution history data, and then the communication device 236 transmits the verification result to the client device 102. For example, the server 106 is a game server, and the execution history data generated by the client device 102 are the game execution history data. When the processor 232 of the sewer 106 determines that the difference between the previous game execution history data and the current game execution history data is less than the preset difference range (e.g., a reasonable increase range about game tokens or play times), the processor 232 of the server 106 selectively replaces the previous game execution history data with the current game execution history data. When the processor 232 of the server 106 determines that the difference between the previous game execution history data and the current game execution history data exceeds the preset difference range, the processor 232 of the server 106 reset new game execution history data for the client device 102. For example, the server 106 uses the previous game execution history data as the new game execution history data for the client device 102 or make the client device 102 operates in an initial state of the game.

In one embodiment, the system 100 further includes a third-party platform 104, and the third-party platform 104 is communicated with the client device 102 and the server 106 through the Internet 108. The third-party platform 104 includes a processor 222, a storage device 224 and a communication device 226, where the communication device 226 and the storage device 224 are electrically connected to the processor 222. For example, the storage device 214 may be a hard disk drive (HDD) or a memory device, and the processor 212 may be a central processing unit (CPU).

The programmed instructions executed by the client device 102 include a software program and a software development kit (SDK) related to the software program. After the client device 102 is connected to the third-party platform 104 through the Internet 108, when the processor 212 of the client device 102 executes the SDK, the processor 212 performs a cash flow process related to the software program through a connection between the client device 102 and the third-party platform 104, so as to generate the cash flow history data. Then, the processor 212 adds the cash flow history data to the execution history data. It should be noted that the verification of the execution history data is disclosed in above embodiments and, thus, are not repeated herein.

In above embodiment, the software program may be a game program. The processor 212 of the client device 102 executes the game program to generate the game execution history data and then adds the game execution history data to the execution history data. In one embodiment, the processor 212 of the client device 102 adds the game execution history data to the execution history data without through the third-party platform 104 and then the network device 216 transmits the execution history data to the server 106. Although the execution history data includes the game execution history data, it should be noted that the verification of the execution history data is disclosed in above embodiments and, thus, are not repeated herein.

In one embodiment, the communication device 226 of the third-party platform 104 is concurrently connected to the client device 102 and the server 106 through the Internet 108, so as to transmit the cash flow history data generated by the processor 212 of the client device 102 to the server 106 for the verification. Specifically, while the communication device 226 of the client device 102 is incapable of connecting the third-party platform 104 through the Internet 108, the processor 212 of the client device 102 stores the cash flow history data in the client database of the storage device 214 temporarily. While the network device 216 of the client device 102 is capable of connecting the third-party platform 104 through the Internet 108, the network device 216 of the client device 102 transmits the cash flow history data to the third-party platform 104, so that the third-party platform 104 can performs the verification related to the cash flow history data. The client device 102 receives a result of the cash flow verification from the third-party platform 104. Therefore, in the third-party platform 104, the processor 222 is configured to execute the verification of the cash flow history data with the server 106. The storage device 224 stores the cash flow history data generated by the client device 102, and the communication device 226 receives the cash flow history data generated by the client device 102 and transmits the cash flow history data to the server 106 through the Internet 108. It should be noted that the verification of the cash flow history data is disclosed in above embodiments and, thus, are not repeated herein.

Figure 3:
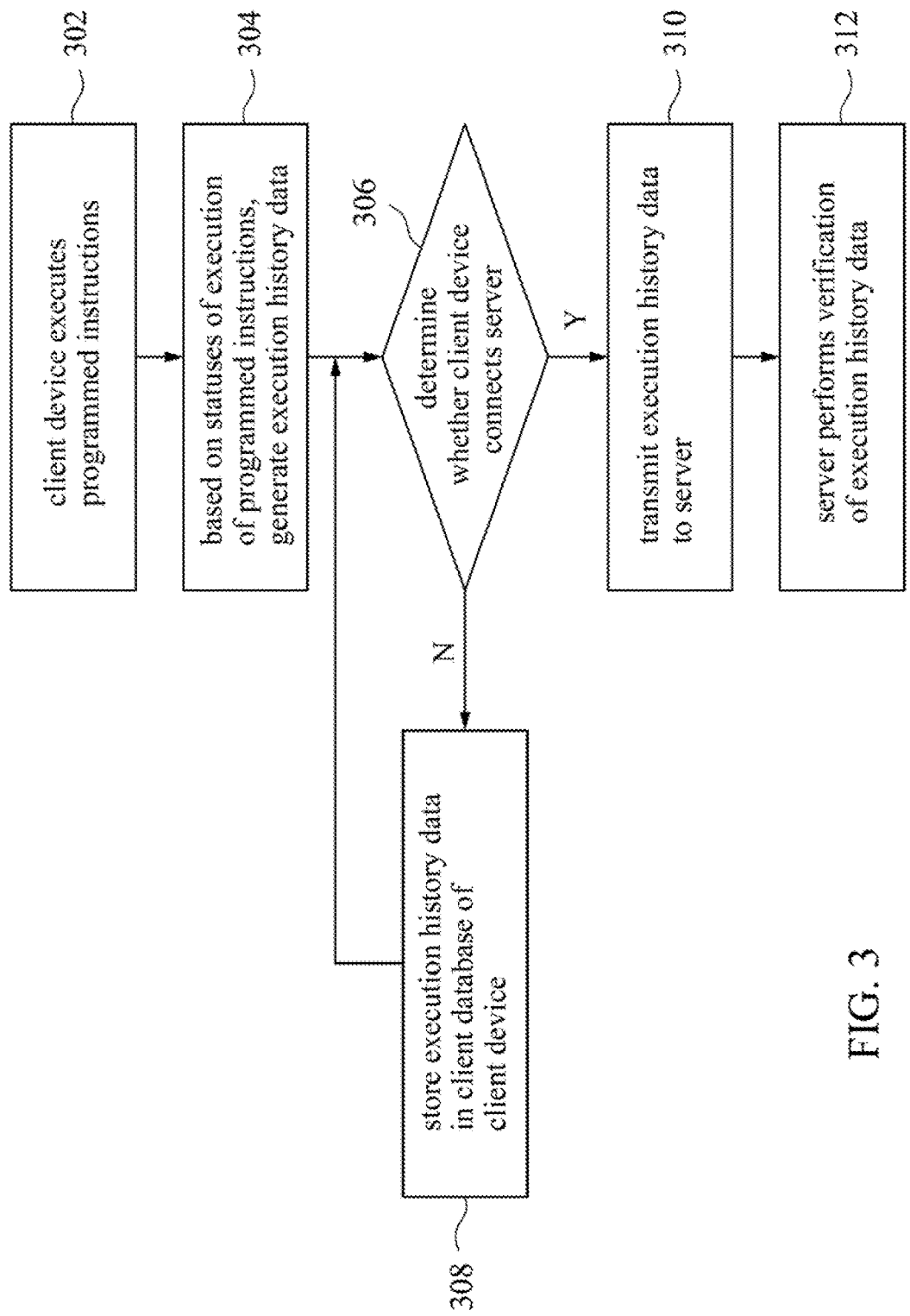
FIG. 3 is a flow chart illustrating a method for cash flow verification by a third-party payment platform according to one embodiment of the present disclosure.

FIG. 3 is a flow chart illustrating a method for cash flow verification by a third-party payment platform according to one embodiment of the present disclosure. As illustrated in FIG. 3, firstly, in operation 302, the client device 102 is used to execute a plurality of programmed instructions. In operation 304, execution history data based on statuses of execution of the programmed instructions are generated. In operation 306, it is determined that the client device is capable of connecting the server through the Internet. If so, operation 310 is performed; if not, operation 308 is performed. In operation 308, while the client device is incapable of connecting the server through the Internet, the client device stores the execution history data in the client database, and operation 306 is performed anew. In operation 310, while the client device is capable of connecting the server through the Internet, the client device transmits the execution history data to the server. In operation 312, the server performs the verification of the execution history data.

In one embodiment, in operation 302, the programmed instructions include a software program and a software development kit (SDK) related to the software program. After the client device is connected to the third-party platform, when the client device executes the SDK, the client device performs a cash flow process related to the software program through a connection between the client device and the third-party platform, so as to generate the cash flow history data. In operation 304, the cash flow history data are added to the execution history data.

In above embodiment, the software program y be a game program. The client device executes the game program to generate the game execution history data. Then, in operation 304, the game execution history data are added to the execution history data.

In one embodiment, in operation 308, after the client device stores the execution history data in the client database temporarily, the client device accesses the execution history data in the client database periodically. Then, after the execution history data are read, operation 306 is performed anew.

In one embodiment, in operation 308, while the client device is incapable of connecting the server through the Internet, the client device encrypts and stores the execution history data in the client database, and then operation 306 is performed anew. Then, while the client device is capable of connecting the server through the Internet, the client device transmits the execution history data that are encrypted to the server. After the server receives the execution history data through the Internet and completes the verification, the server transmits a verification result to the client device. For example, the client device encrypts the execution history data according to advanced encryption standard (AES) and the server decrypts the encrypted execution history data for the verification. It should be noted that the AES is disclosed in above embodiments and, thus, are not repeated herein.

In above embodiment, after the client device receives the verification result, when the client device selectively deletes the execution history data in the client database. Specifically, when the client device determines that the verification result comprises information on process completion, the client device deletes the execution history data that temporarily stored in the client database.

In one embodiment, in operation 312, the server uses the previous execution history data stored n the storage device as a basis of verification and then verifies the current execution history data generated by the client device, where the previous execution history data are previously generated and transmitted to the server. Specifically, the server uses default numerical functions to compute a preset difference range and then analyze whether a difference between the previous execution history data and the current execution history data exceeds the preset difference range, so as to produce a verification result, where the default numerical functions are, related to the previous execution history data and the current execution history data. For example, the server is a game server, and the execution history data generated by the client device are the game execution history data; the server computes the preset difference range (e.g., a reasonable increase range about game tokens or play times) based on a time interval between any two of the game execution history data.

In above embodiment, based on the verification result, the per selectively replaces the previous execution history data with the current execution history data. Specifically, when the difference between the previous execution history data and the current execution history data is less than the preset difference range, the server deletes the previous execution history data and stores the current execution history data that pass through the verification in its storage device, and then transmits the verification result to the client device. When the difference between the previous execution history data and the current execution history data exceeds the preset difference range, the server deletes the current execution history data, and then transmits the verification result to the client device. For example, the server is a game server, and the execution history data generated by the client device are the game execution history data. When the server determines that the difference between the previous game execution history data and the current game execution history data is less than the preset difference range (e.g., a reasonable increase range about game tokens or play time the server selectively replaces the previous game execution history data with the current game execution history data. When the server determines that the difference between the previous game execution history data and the current game execution history data exceeds the preset difference range, the server resets new game execution history data for the client device. For example, the server uses the previous game execution history data as the new game execution history data for the client device or make the client device operates in an initial state of the game.

Figure 4:
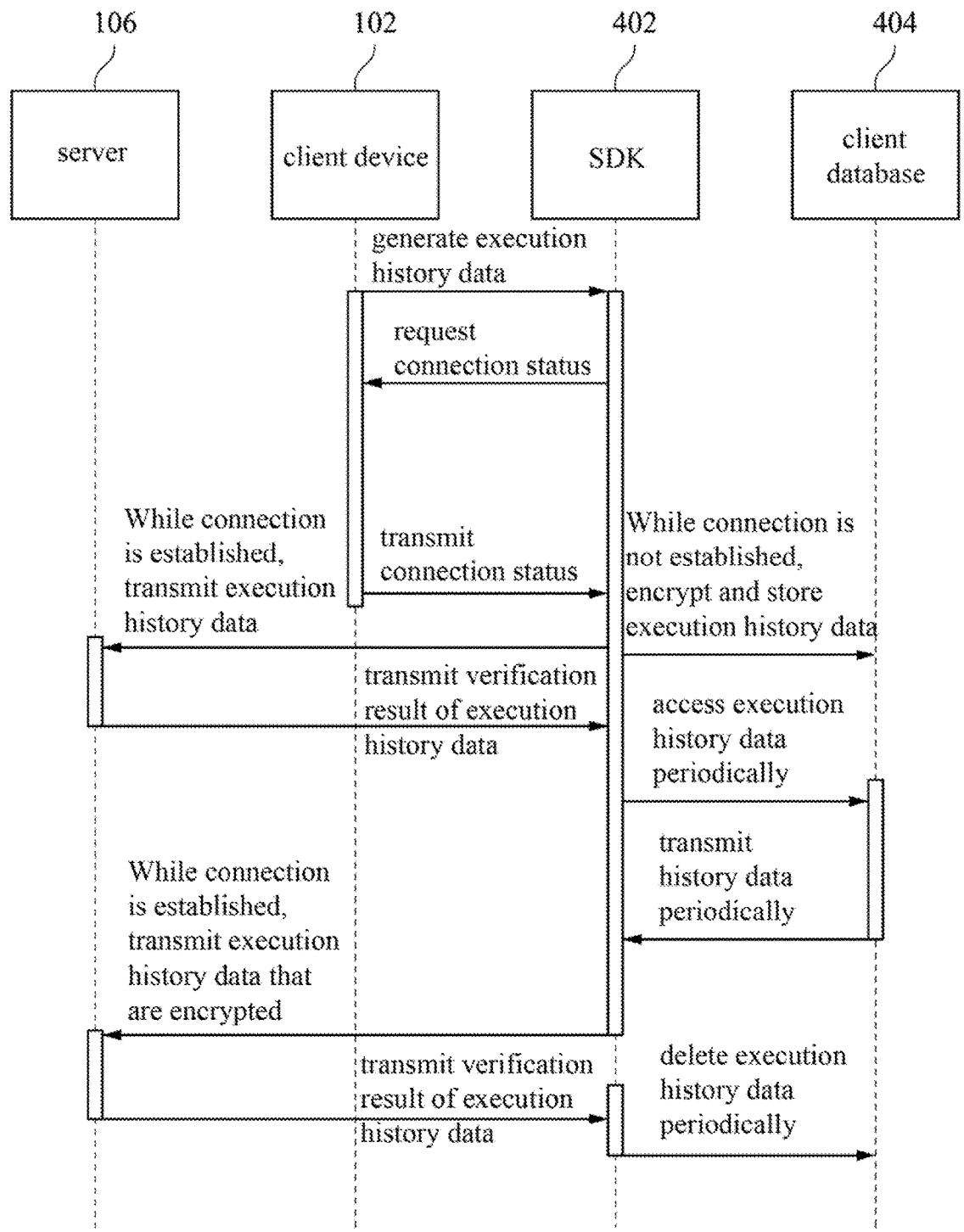
FIG. 4 is a schematic diagram illustrating a system for cash flow verification by a third-party payment platform according to one embodiment of the present disclosure.

FIG. 4 is a schematic diagram illustrating a system for cash flow verification by a third-party payment platform according to one embodiment of the present disclosure. As illustrated in FIG. 4, firstly, the client device 102 executes the SDK 402 to generate the execution history data. After the client device 102 generates the execution history data, the SDK 402 requests the client device 102 to ensure a connection status between the client device 102 and the server 106. For example, the format of the execution history data is JavaScript object notation (JSON).

Then, the SDK 402 selectively stores the execution history data in the client database built in the client device 102 temporarily on the basis of the connection status between the client device 102 and the server 106. Specifically, while the client device 102 is capable of connecting the server 106 through the Internet 108, the SDK 402 transmits the execution history data to the server 106 for verification and receives the verification result of the execution history data from the server 106. While the client device 102 is incapable of connecting the server 106 through the Internet 108, the SDK 402 encrypts and stores the execution history data in the client database 404.

After the client database 404 stores the execution history data in the client database temporarily, the SDK 402 accesses the execution history data in the client database 404 periodically and then ensure a connection status between the client device 102 and the server 106 anew. The SDK 402 repeats above operations in an iterative manner until the execution history data are transmitted to the server 106 for the verification.

Finally, the SDK 402 transmits the execution history data that are encrypted to the server 106. After receiving the verification result of the execution history data from the server 106, the SDK 402 deletes the execution history data in the client database 404. For example, the SDK 402 encrypts the execution history data according to advanced encryption standard (AES), and the server 106 decrypts the encrypted execution history data for the verification. It should be noted that the AES is disclosed in above embodiments and, thus, are not repeated herein.

In view of the above, the network device, the storage device and the processor are integrated in the client device, in which the client database is built in the storage device additionally. In this way, the client device can selectively store the execution history data in aforementioned built-in client database temporarily or transmits the execution history data to the server. Specifically, while the client device is incapable of connecting the server through the Internet, the client device can execute a plurality of programmed instructions to generate execution history data and stores the execution history data in the client database temporarily. While the client device is capable of connecting the server through the Internet, the client device transmits the execution history data to the server for verification.

In some approaches, while Internet is unstable, the validation of the execution history data is repeated constantly between the client device and the server, which led to a waste of bandwidth and a decrease of device performance. However, in the present disclosure, the execution history data are stored in the client database temporarily and when Internet is stable, the execution history data are transmitted to the server, so as to effectively improve the efficient use of bandwidth and enhance the operating efficiency of the client device and the server, thereby reducing the burden on the server to process the execution history data.

In view of the foregoing, since the client database is built in the client device, the data transmissions between the client device and the server are more flexible. Specifically, under the weak networking status (e.g., some remote areas, no unlimited Internet access, less cell sites, user habits . . . etc.), the client device can not immediately receives data from or transmits data to the server by using its built-in client database, so as to decrease the transmission or reception of data, thereby reducing the crash of the server.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. A system for cash flow verification by a third-party platform, comprising:
   a server; and
   a client device comprising:
      a network device;
      a storage device configured to store a plurality of programmed instructions and establish a client database, the programmed instructions comprises a software game program and a software development kit (SDK) related thereto; and
      a processor configured to execute the programmed instructions to generate execution history data, wherein the execution history data comprises game execution history data and cash flow history data, wherein when executing the SDK, the processor performs a cash flow process related to the software game program through a connection between the network device and the third-party platform, so as to generate the game execution history data and cash flow history data,
   wherein while the network device is incapable of connecting to the server through an Internet, the processor stores the execution history data in the client database, and while the network device is capable of connecting to the server through the Internet, the processor transmits the execution history data to the server through the network device for verification, the verification comprises cash flow verification;
   wherein when the server determines that a difference between the transmitted execution history data and previously stored execution history data is less than a preset difference range, the server selectively replaces the previously stored execution history data with the transmitted execution history data and transmits a verification result to the client device, the preset difference range representing a reasonable increase range in game tokens or play time;
   wherein when the server determines that the difference between the previously stored execution history data and the transmitted execution history data exceeds the preset difference range, the server resets new execution history data for the client device; and
   wherein after the client device receives the verification result and determines that the verification result comprises information on process completion, the processor deletes the stored execution history data in the client database.

2. The system of claim 1, wherein the processor encrypts and stores the execution history data in the client database.

3. A method for cash flow verification by a third-party platform, comprising:
   storing, in a storage device of a client device, a plurality of programmed instructions, wherein the client device has a client database and the programmed instructions comprises a software game program and a software development kit (SDK) related thereto;

executing, by a processor of the client device, the SDK to perform a cash flow process related to the software game program through a connection between a network device of the client device and the third-party platform, so as to generate execution history data comprising game execution history data and cash flow history data;

storing the execution history data in the client database, while the client device is incapable of connecting the server through an Internet;

transmitting the execution history data to the server for verification comprising cash flow verification, while the client device is capable of connecting the server through the Internet;

selectively replacing, by the server, previously stored execution history data with the transmitted execution history data and transmitting a verification result to the client device, when the server determines that a difference between the transmitted execution history data and the previously stored execution history data is less than a preset difference range, the preset difference range representing a reasonable increase range in game tokens or play time;

resetting new execution history data, by the server, for the client device when the server determines that the difference between the previously stored execution history data and the transmitted execution history data exceeds the preset difference range; and deleting, by the processor, the stored execution history data in the client database after the client device receives the verification result and determines that the verification result comprises information on process completion.

4. The method of claim 3, wherein the client device encrypts and stores the execution history data in the client database.

\* \* \* \* \*